United States Patent [19]

Tomoda et al.

[11] Patent Number: 4,916,682

[45] Date of Patent: Apr. 10, 1990

[54] OPTICAL DISK APPARATUS WITH REMAINING TIME SPECIFICATION

[75] Inventors: Haruhisa Tomoda, Kashihara; Yasuomi Shimada, Ikoma, both of Japan

[73] Assignee: Matsushita Electric Industrial Co., Ltd., Osaka, Japan

[21] Appl. No.: 238,218

[22] Filed: Aug. 30, 1988

[30] Foreign Application Priority Data

Sep. 2, 1987 [JP] Japan .................................. 62-219553

[51] Int. Cl.$^4$ .......................... G11B 7/00; G11B 27/00
[52] U.S. Cl. ...................................... 369/32; 358/311; 360/13; 360/15; 369/58; 369/83; 369/84; 369/85
[58] Field of Search ................. 360/55, 137, 13, 14.1, 360/14.2, 14.3, 15; 358/335, 311; 369/53, 58, 83, 84, 85, 32

[56] References Cited

U.S. PATENT DOCUMENTS 4,280,159 7/1981 Nakayama ........................... 360/137
4,496,997 1/1985 Ohtsuki ................................ 360/13

Primary Examiner—Robert L. Richardson
Attorney, Agent, or Firm—Spencer & Frank

[57] ABSTRACT

A device for reproducing a plurality of optical disks previously stores a remaining time obtained by substracting the total playing time of music pieces of an optical disk from the play time corresponding to the length of a recording tape set by a user and sequentially stores the number of music pieces of another optical disk which can be recorded within the remaining time which are obtained by an edition operating section. The remaining time of a recording tape, which occurs when recording a plurality of music pieces recorded on an optical disk by using a magnetic recording/reproducing device such as a tape recorder, can be effectively used to easily set the number of music pieces when reocrding on the tape the music pieces of another.optical disk.

5 Claims, 6 Drawing Sheets

24 --- DISPLAY SECTION
25a --- PLAY KEY
25b --- EDITION SPECIFYING KEY
25c --- PLAY TIME INPUT KEY
25d --- TEN MUSIC NUMBER INPUT KEY
25e --- REMAINING TIME STORING AND EDITING KEY

4 — DISPLAY SECTION
5a — PLAY KEY
5b — EDITION SPECIFYING KEY
5c — PLAY TIME INPUT KEY
5d — TEN MUSIC NUMBER INPUT KEY

OPTICAL DISK APPARATUS WITH REMAINING TIME SPECIFICATION

BACKGROUND OF THE INVENTION

The present invention relates to an optical disk reproducing device such as a compact disk player.

The previously known compact disk player belonging to such a category has such a construction as shown in FIGS. 5 to 8.

In FIG. 5, numeral 1 is a signal detection section (e.g. optical pick-up) for reading or detecting music information and play time information recorded on an optical disk (hereinafter simply referred to as disk); 2 is a signal output section for converting the information read by the signal detection section 1 into an audio signal to be outputted; and 3 is a control section for controlling the signal detection section 1 and the signal output section 2. The control section 3 includes an A/B side edition operating section 6 which will be described later in detail, and a play time counting section 7 for counting the time from play start to play completion on the basis of the play time information detected by the signal detection section 1. 4 is a display section for displaying the play time read by the signal detection section 1, a remaining time used when editing playing music pieces, etc. As shown in FIG. 7, 5 is a key switch section consisting of a play key 5a which gives a command of starting the play to the control section 3, an edition specifying key 5b for specifying the edition of music pieces to be played, a play time input key 5c for inputting the playing time to be edited and ten music number inputting keys 5d for inputting the numbers of music pieces when effecting the edition of music pieces in the optional order. (It should be noted that the phrase "to specify" is used in the same sense as the phrase "to designate" in this specification.)

The A/B side edition operating section 6 is constructed, as shown in FIG. 6, a play time input means 8 for inputting the playing time to be used for edition, a ½ operation (calculation) section 9 for obtaining the recording time for either one side (assuming that a recording medium includes two sides consisting of an A side and a B side) by calculating a half value of the time inputted from the playing time input means 8, an A/B side editing time storage section 13 for storing the thus obtained time, an edition operating section 11 for obtaining a music piece which can be played within the A/B side editing time, a playing music number storage section 12 for storing the numbers and order of the music pieces edited by the edition operating section 11 and an optional music number input means 10 which is used in performing the edition in the order other than that recorded in the disk and in accordance with an optional edition number of music pieces.

The control or processing as shown in the flowchart of FIG. 8 was carried out in the arrangement as mentioned above.

In step 1, if or not the edition specifying key 5b has been pressed is judged. If it is "yes", the processing is shifted to step 2, whereas if it is "no", the processing is ended. In step 2, an input of the play time when editing is received from the play time input key 5c. In step 3, if or not the play time has been inputted is judged. If it is "yes", the processing is shifted to step 4, whereas, if it is "no", the processing is returned to step 2 (this processing is repeated until the input of the play time has been recognized). In step 4, a half value of the specified time obtained by the ½ operation section 9 is stored in the A/B editing time storage section 13. In step 5, the music pieces which can be played within the editing time are calculated and the music pieces to be played on the A side and the B side are edited. Then, it is also possible to change the music numbers and the order thereof to be edited by inputting an optional music number by the optional music number input means 10. In step 6, whether the play key 5a has been pressed or not is judged. If it is "yes", the processing is shifted to step 7 whereas if it is "no", the processing is put into the standby state at step 6. In step 7, the music pieces edited for the A side are played. In step 8, whether the A side editing music pieces have been played until a final music piece thereof or the play time has coincided with the A side editing time or not is judged. If it is "yes", the processing is shifted to step 9, whereas, if it is "no", the processing is returned to step 7 and steps 7 to 8 are repeated until the play has been completed. In step 9, whether or not there are music numbers edited for the B side is judged. If it is "yes", the processing is shifted to step 10, whereas, if it is "no", the processing is ended. In step 10, whether a play start command has been input by the play key 5 or not is judged. If it is "yes", the processing is shifted to step 11, whereas, if it is "no", the processing is put into the standby state at step 10. In step 11, the music pieces edited on the B side are played. In step 12, whether or not the B side editing music pieces have been played until a final music piece thereof or the play time has coincided with the B side editing time is judged. If it is "yes", the processing is ended, whereas, if it is "no", the processing is returned to step 11, and steps 11 to 12 are repreated until the play has been completed.

The prior art arrangement as mentioned above, however, has the following disadvantage. Namely, in order to edit and record a plurality of disks, a very complicated operation is required. For example, it is assumed now to perform the following operation items:①Nos. 1 to 4 music pieces on a first optical disk are to be recorded on the A side of a magnetic recording tape; ②Nos. 1 to 2 music pieces on a second optical disk are to be recorded on the remaining portion of the A side thereof; and ③Nos. 3 to 9 music pieces on the second optical disk are to be recorded on the B side thereof.

In this case, when the operator inputs a tape length as the play time for performing the operation item ①, the device operates to calculate a half value of the inputted time length to provide a play time only for one side. Then, upon completion of the operation item ①, the operator has to store a remaining time. After the first disk has been replaced by the second disk, the operator has to input a play time twice as long as the stored remaining time to be used for performing the operation item②. Further, after the operation item② has been completed, the operator has to input a tape length again as the play time for performing the operation item③.

SUMMARY OF THE INVENTION

The present invention is proposed to overcome the disadvantage of the prior art as mentioned above, and an object of the present invention is to provide an optical disk reproducing device which can edit and record a plurality of disks through a simple operation.

In order to attain this object, in accordance with the present invention, there is provided an optical disk reproducing device comprising a signal detection section for detecting information recorded on an disk, a play time counting section for counting the time from the start of play to the end of play on the basis of the play time information detected by the signal detection section, a play time input means for inputting a playable time when recording the information on the disk by a separate recording device, an edition time storage section for storing the time inputted by the play time input means, a subtraction means which operates upon completion of the play for the disk to subtract the time obtained by the play time counting section from the time stored in the edition time storage section so as to obtain a remaining time, a remaining time edition specifying means for storing the remaining time and specifying to effect a next edition of the play time for another disk on the basis of the remaining time, the above edition time storage section storing the remaining time obtained by the subtraction means, an edition operating section for calculating music pieces which can be played within the time stored in the edition time storage section, and a playing music number storage section for sequentially storing the numbers of music pieces edited by the edition operating section.

In the operation of the device of the present invention, in the case where a plurality of disks are to be recorded, if the edition using a remaining time is specified by the remaining time edition specifying means, the remaining time for the specified play time is stored after the completion of the edition and play of a first disk, and the edition for a second disk is effected using the remaining time. Thus, it becomes unnecessary for an operator of the device of the present invention to store a remaining time and to input the remaining time again, and thus it becomes possible for the operator to easily edit and record a plurality of optical disks.

DESCRIPTION OF THE PREFERRED EMBODIMENTS

Figure 1:
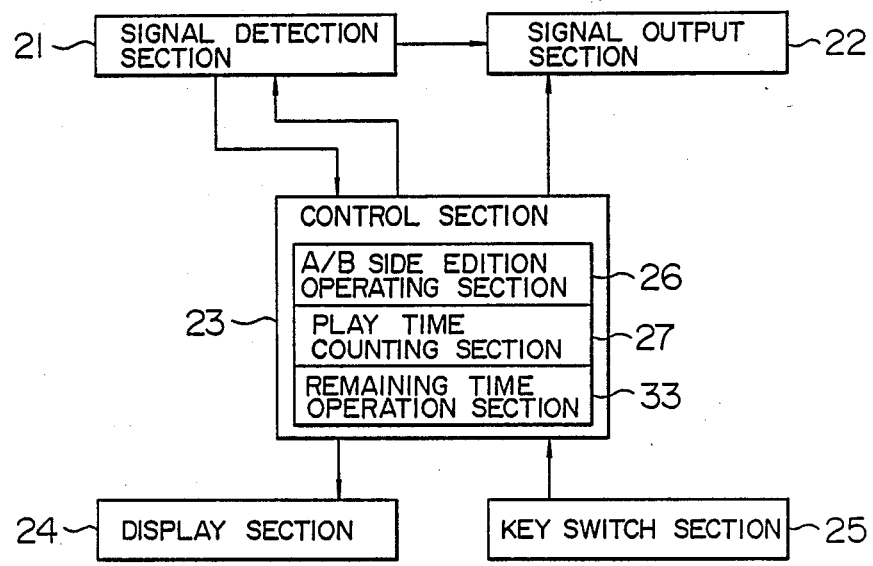
FIG. 1 is a block diagram showing an optical disk reproducing device of an embodiment of the present invention.
Figure 2:
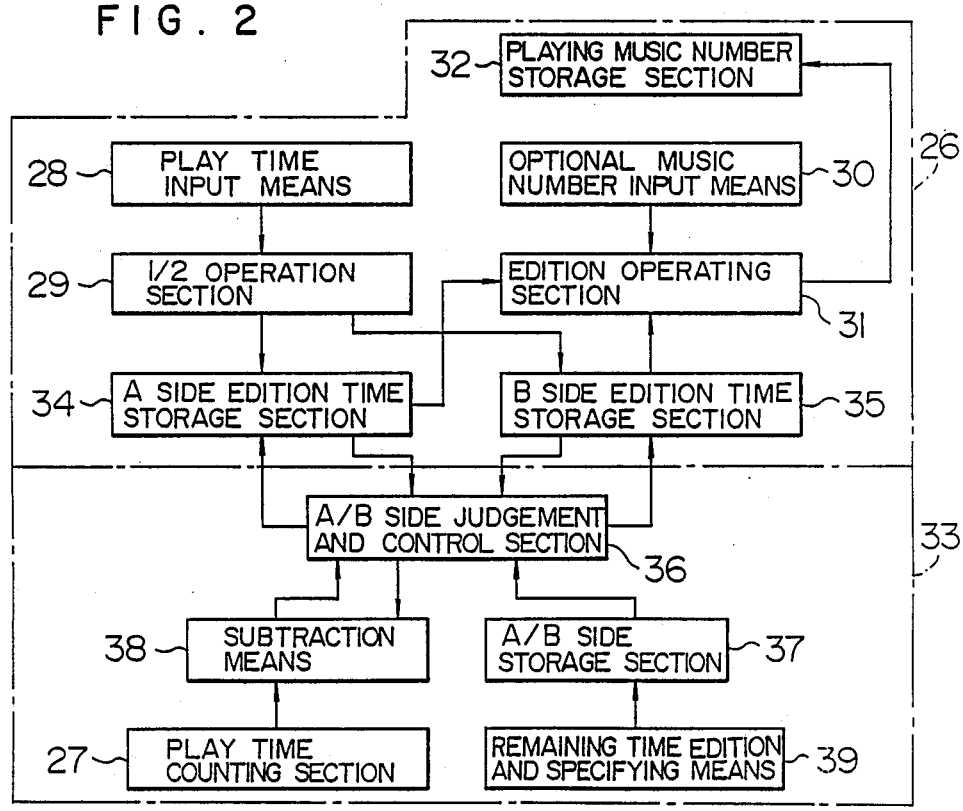
FIG. 2 is a block diagram showing the main part of the device shown in FIG. 1.
Figure 3:
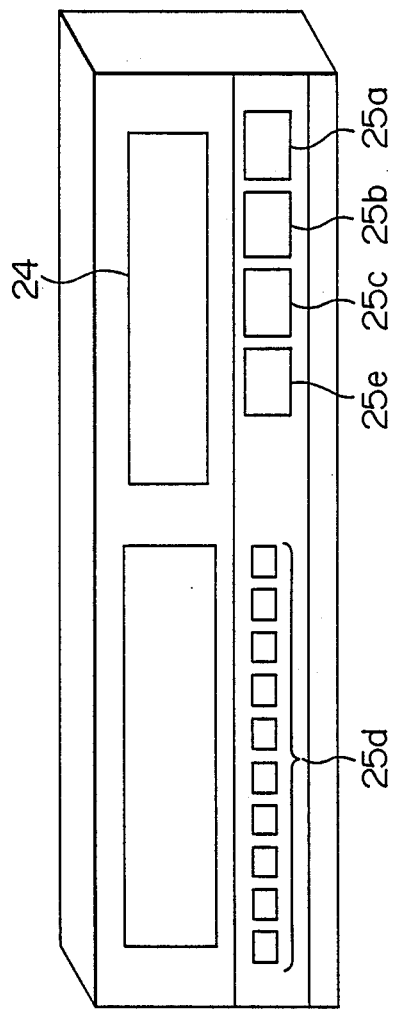
FIG. 3 is a perspective view showing the external appearance of the device shown in FIG. 1.

An embodiment of the present invention will be explained with reference to FIGS. 1 to 4.

In these figures, numerals 21 and 22 are a signal detection section and a signal output section, respectively, which have the same function as those of the prior art. 23 is a control section for controlling the signal detection section 21 and the signal output section 22. The control section 23 includes a play time counting section 27 which has the same function as that of the prior art, an A/B side edition operating (calculating) section 26, where the A/B sides are two record portions of a recording medium, as will be described later in detail, and a remaining time operating (calculating) section 33. 24 is a display section for displaying the information such as a play time, a remaining time produced at the time of editing music pieces to be played, etc. 25 is a key switch section comprising a play key 25a which sends a command to the control section 23 to start the play, an edition specifying key 25b for specifying the edition of music pieces to be played, a play time input key 5c for inputting the play time to be edited, ten music number inputting keys 25d for inputting the numbers of music pieces when effecting the edition of music pieces in the optional order, and a remaining time edition specifying key 25e which sends a command to the control section 23 to effect the edition of the play time for another optical disk using the remaining time produced when the editing and playing for one recording side have been completed.

The A/B side edition operating section 26 includes a play time input means 28, a ½ operation (calculation) section 29, an optional music number input means 30, an edition operating (calculating) section 31 and a playing music number storage section 32, which have the same function as those of the prior art device, and the sides edition operating section 26 further includes an A side edition time storage section 34 and a B side edition time storage section 35 which respectively store the time obtained by the ½ operation section 29 as the respective lengths of two portions, that is, A side recording portion and B side recording portion of a recording medium.

The remaining time operation section 33 includes a remaining time edition specifying means 39 which specifies the edition using a remaining time for the control section when effecting the edition and recording of a plurality of optical disks, an A/B side storage section 37 which stores the edition using a remaining time in either one of the sides A and B when the edition using a remaining time is specified, a subtraction means 38 for subtracting the play time obtained by the play time counting section 27 from the edition time to thereby provide a remaining time, and an A/B side judgement and control section 36 which judges as to the remaining time of which side should be obtained in accordance with the storage value in the A/B storage section 37 thereby to select the data of either the A side edition time storage section 34 or the B side edition time storage section 35 so that the selected data is sent to the subtraction means 38, and to select either the A side edition time storage section 34 or the B side edition time storage section 35 so that the remaining time obtained by the subtraction means 38 is stored therein, thereby controlling the flow of the data.

Figure 4:
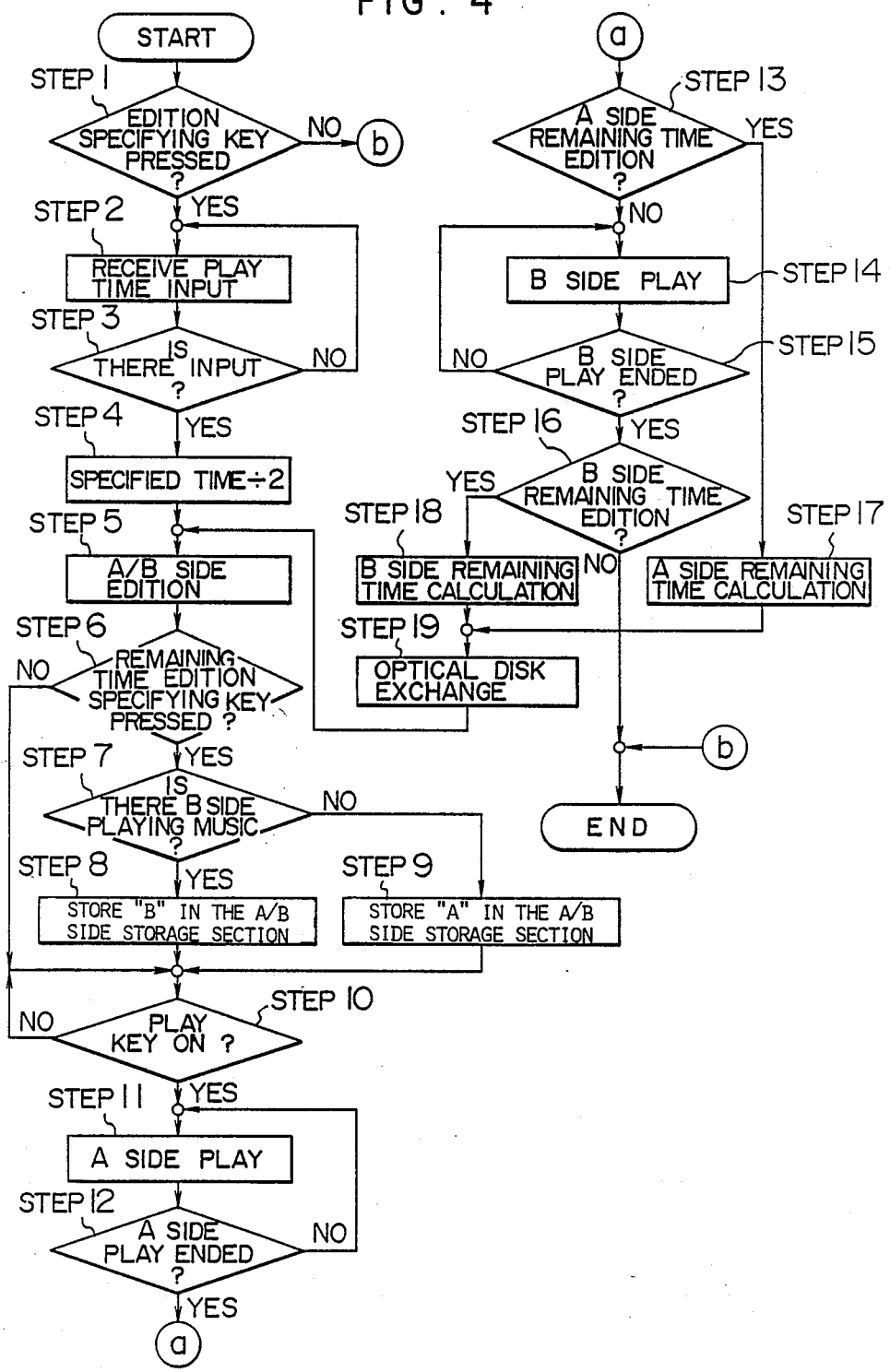
FIG. 4 is a flowchart for explaining the process of editing a plurality of optical disks.
Figure 5:
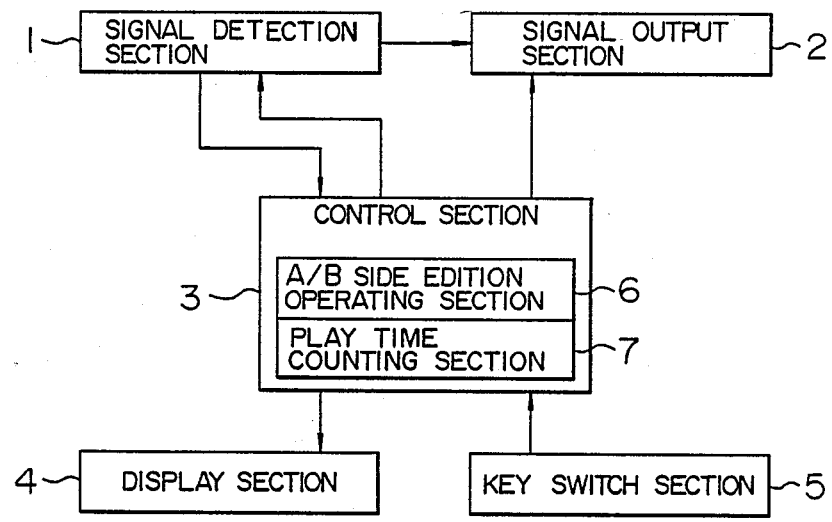
FIG. 5 is a block diagram showing an optical disk reproducing device of the prior art.
Figure 6:
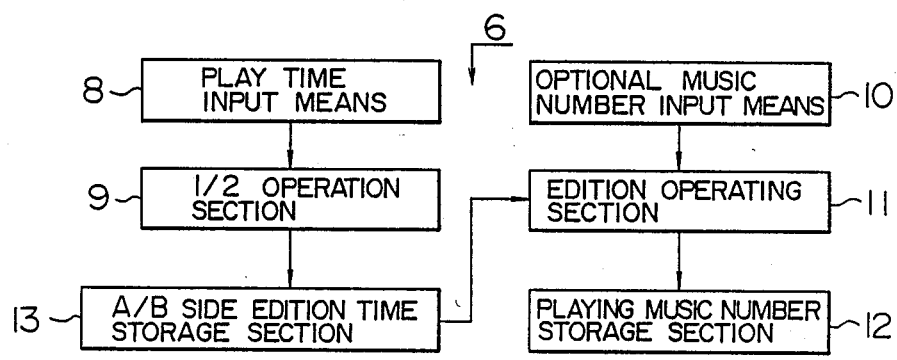
FIG. 6 is a block diagram showing the main part of the device shown in FIG. 5.
Figure 7:
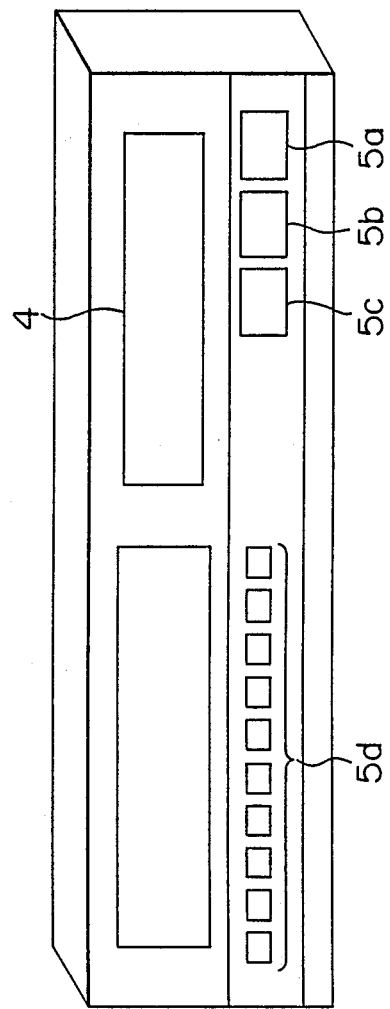
FIG. 7 is a perspective view showing the external appearance of the device shown in FIG. 5.

The operation of an optical disk reproducing device of an embodiment of the present invention constructed as described above will be explained with reference to the flowchart shown in FIG. 4.

Figure 8:
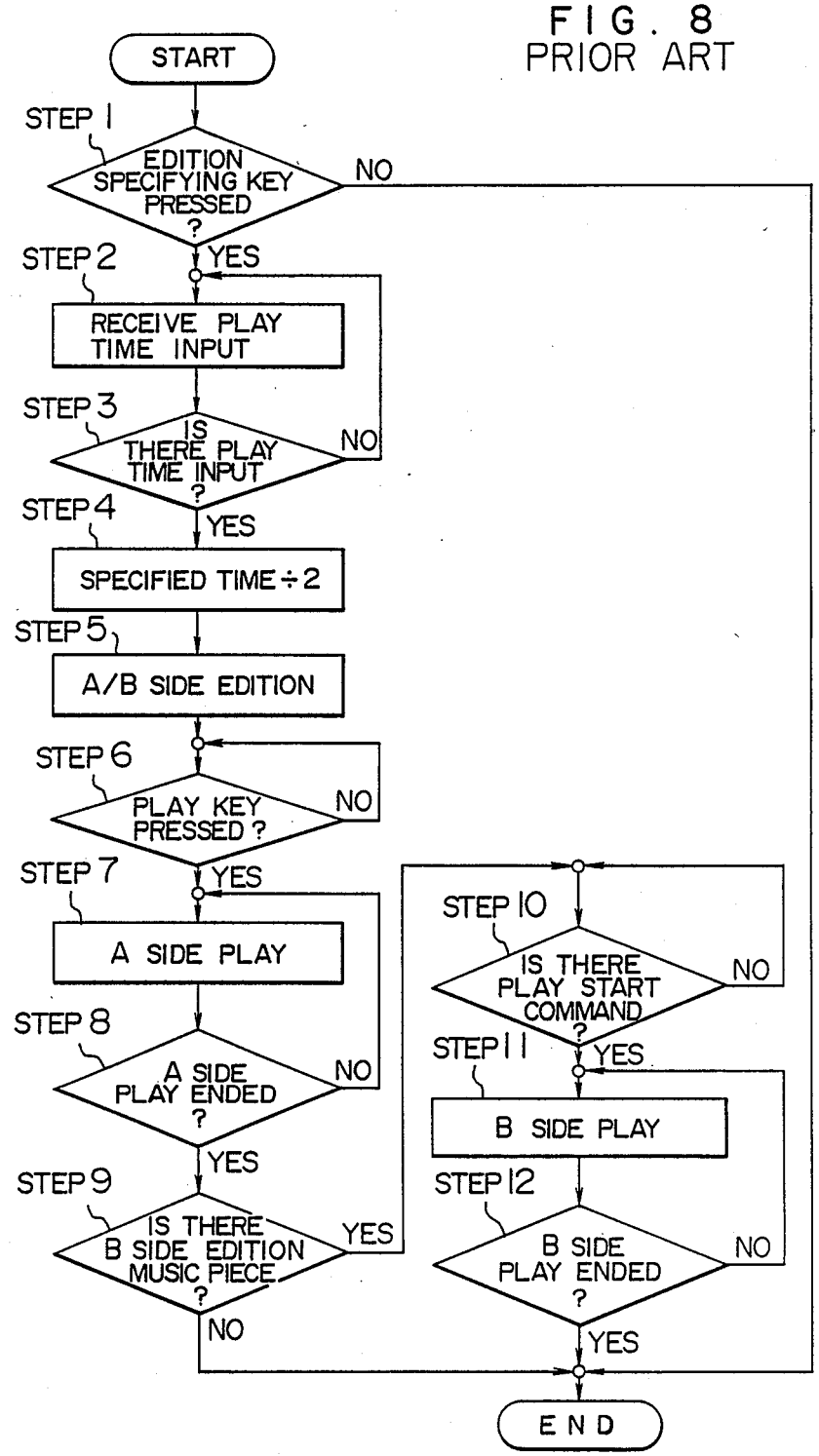
FIG. 8 is a flowchart for explaining the control operation of the prior art device shown in FIG. 5.

Steps 1 to 4 are not explained here since they are entirely the same as those of the prior art shown in FIG. 8. In step 5, calculation is performed by the edition operating section 31 to determine music pieces which can be played within the time periods stored in the A side edition time storage section 34 and the B side edition time storage section 35, thereby editing the music pieces to be played on the A and B sides, respectively. In this case, it is also possible to change the music number and the music piece order by inputting any optional music number from the optional music number input means 30. In step 6, whether the remaining time edition specifying key 25e has been pressed or not is judged. If it is "yes", the processing is shifted to step 7. Whereas, if it is "no", the processing jumps to step 10, and in this case an ordinary edition play of a single optical disk results. In step 7, a judgement is made as to whether a music piece to be played on the B side is included in the playing music number storage section 32 after the edition has been completed.

If it is "yes", the edition of a second optical disk is decided to be the edition using a remaining time of the B side and the processing is shifted to step 8, whereas, if it is "no", it is decided to be the edition using a remaining time of the A side and the processing is shifted to step 9. In step 8, "B" is stored in the A/B side storage section 37, and in step 9, "A" is stored in the A/B side storage section 37. In step 10, whether the play key 25a has been pressed or not is judged. If it is "yes", the processing is shifted to step 11, whereas, if it is "no", the processing is put into the standby state at step 10. In step 11, the music pieces edited for the A side are played. In step 12, a judgement is made as to whether the A side edition music pieces have been played until a final music piece thereof or not, or the play time provided by the play time counting section 27 has coincided with the A side edition time or not. If it is "yes", the processing is shifted to step 13, whereas, if it is "no", the processing is returned to step 11 and the processings of steps 11 to 12 are repeated until the A side play is completed.

In step 13, a judgement is made as to whether the present edition is an A side remaining time using edition or not in accordance with the value stored in the A/B side storage section 37. If it is "yes", the processing is jumped to step 17, whereas, if it is "no", the processing is shifted to step 14. In step 14, music pieces edited for the B side are played. In step 15, a judgement is made as to whether the B side edition music pieces have been played until a final music piece thereof or not, or the B side play time has coincided with the B side edition time or not. If it is "yes", the processing is shifted to step 16, whereas, if it is "no", the processing is returned to step 14 and the processings of steps 14 to 15 are repeated until the B side play is completed. In step 16, a judgement is made as to whether the present edition is a B side remaining time using edition or not in accordance with the value stored in the A/B side storage section 37. If it is "yes", the processing is shifted to step 18, whereas, if it is "no", the processing comes to an end. In step 17, the time obtained by the play time counting section 27 is subtracted from the time stored in the A side edition time storage section 34 through the subtraction means 38 to obtain the A side remaining time which is stored in the A side edition time storage section 34. Likewise, in step 18, the time obtained by the play time counting section 27 is subtracted from the time stored in the B side edition time storage section 35 to obtain the B side remaining time which is stored in the B side edition time storage section 35. Further, at this time, zero is stored in the A side edition time storage section 34. After the optical disk to be edited is exchanged in step 19, the processing is returned to step 5 where the edition is performed in accordance with the values stored in the A side edition time storage section 34 and the B side edition time storage section 35.

As described above, in accordance with the embodiment of the present invention, when the edition and recording of music pieces is performed on a recording medium from a plurality of optical disks by pressing the remaining time edition specifying key 25e, a remaining time of the edition time is calculated and stored after the edition and play of an optical disk is completed. Then, when the optical disk is exchanged with another optical disk, the edition of the other optical disk can be performed by using the remaining time. Thus, the edition and recording of a plurality of optical disks can be easily performed.

For example, assuming to perform the following operation items: ①Nos. 1 to 4 music pieces on a first optical disk are to be recorded on the A side of a magnetic recording tape; ②Nos. 1 to 2 music pieces on a second optical disk are to be recorded on the remaining portion of the A side thereof; and ③Nos. 3 to 9 music pieces on the second optical disk are to be recorded on the B side thereof.

In this case, if the play time (tape length) is inputted to perform the edition of the operation item ① and thereafter the remaining time edition specifying key 25e is pressed, the device automatically calculates the remaining time and stores it after the completion of playing Nos. 1 to 4 music pieces. Next, if the first optical disk is exchanged with a second optical disk, the device automatically sets the time necessary for the edition and recording by using the remaining time of the A side and in accordance with the tape length (namely, the time length for one half the tape length) for the B side. Therefore, it is not necessary to input the play time again for the operation items ② and ③.

Incidentally, although in this embodiment, the total time for both A and B sides of a magnetic recording tape is inputted by using the play time input key 25c and through the play time input means 28, the play time for either one of the A side and the B side may be inputted. In this case, it is not necessary to calculate a half value of the play time.

What is claimed is:

1. A reproducing device for optical disks comprising:
   a signal detection section for detecting information on an optical disk;
   a play time counting section for counting the time from the start of play to the end of play on the basis of the play time information detected by said signal detection section;
   a play time input means for inputting a playable time when recording the information on said optical disk by a separate recording device;
   an edition time storage section for storing the time inputted by said play time input means;
   a subtraction means which operates upon completion of the play for said optical disk to subtract the time obtained by said play time counting section from the time stored in said edition time storage section so as to obtain a remaining time;
   said edition time storage section storing the remaining time obtained by the subtraction means;
   an edition operating section for calculating music pieces which can be played within the time stored in said edition time storage section;
   a playing music number storage section for sequentially storing the numbers of music pieces edited by said edition operating section; and
   a remaining time edition specifying means for storing the remaining time and specifying to perform a next edition of the play time for another optical disk on the basis of the remaining time stored in said edition time storage section.

2. A reproducing device for optical disks comprising:

a signal detection section for detecting information recorded on an optical disk;

a play time counting section for counting the time from the start of play to the end of play on the basis of the play time information detected by said signal detection section;

a play time input means for inputting a playable time when recording the information on said optical disk by a recording device having A and B recording sides;

a ½ operation section for calculating a half value of the time inputted by said play time input means;

a subtraction means which operates upon completion of the play for said optical disk to subtract the time obtained by said play time counting section from the time obtained by said ½ operation section so as to obtain a remaining time;

an edition time storage section for storing the remaining time obtained by said subtraction means or the time obtained by said ½ operation section;

an edition operating section for calculating music pieces which can be played within the time stored in said edition time storage section;

a playing music number storage section for sequencially storing the numbers of music pieces edited by said edition operating section; and a remaining time edition specifying means for storing the remaining time and specifying to perform a next edition of the play time for another optical disk on the basis of the remaining time stored in said edition time storage section.

3. A reproducing device for optical disks according to claim 1, wherein two said edition time storage section are comprised, one of them being A side edition time storage section and the other one being B side edition time storage section, and said reproducing device further comprises an A/B side storage section for storing that the remaining time of which one of the A side and the B side is to be used for a next edition, and an A/B side judgement/control section for controlling the flow of data for obtaining the remaining time of the A side or the B side in accordance with the information stored in said A/B side storage section, thereby performing the edition of the A side or the B side when the reproduction from a plurality of optical disks and the recording on the A side or the B side are performed.

4. A reproducing device for optical disks according to claim 2, wherein two said edition time storage section are comprised, one of them being A side edition time storage section and the other one being B side edition time storage section, and said reproducing device further comprises an A/B side storage section for storing that the remaining time of which one of the A side and the B side is to be used for a next edition, and an A/B side judgement/control section for controlling the flow of data for obtaining the remaining time of the A side or the B side in accordance with the information stored in said A/B side storage section, thereby performing the edition of the A side or the B side when the reproduction from a plurality of optical disks and the recording on the A side or the B side are performed.

5. A reproducing device for optical disks according to claim 2, further comprising an optional music number input means for inputting an optional music number when editing music pieces to be played, thereby making it possible to change optionally the music pieces to be played and the order of the music pieces.

* * * * *